(12) United States Patent
Strobl et al.

(10) Patent No.: US 8,711,744 B2
(45) Date of Patent: Apr. 29, 2014

(54) COMMISSIONING INCOMING PACKET SWITCHED CONNECTIONS

(75) Inventors: Stefan Strobl, Obermichelbach (DE); Matthias Grimm, Stein (DE); Jürgen Lerzer, Neumarkt/OPf (DE); Stefan Meyer, Hoechstadt (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 229 days.

(21) Appl. No.: 13/121,320

(22) PCT Filed: Sep. 8, 2009

(86) PCT No.: PCT/EP2009/061635
§ 371 (c)(1),
(2), (4) Date: Apr. 7, 2011

(87) PCT Pub. No.: WO2010/034618
PCT Pub. Date: Apr. 1, 2010

(65) Prior Publication Data
US 2011/0199947 A1 Aug. 18, 2011

Related U.S. Application Data

(60) Provisional application No. 61/101,209, filed on Sep. 30, 2008, provisional application No. 61/100,789, filed on Sep. 29, 2008.

(51) Int. Cl.
*H04B 7/00* (2006.01)
*H04W 76/02* (2009.01)
*H04W 88/02* (2009.01)

(52) U.S. Cl.
CPC .......... *H04W 76/025* (2013.01); *H04W 88/022* (2013.01)

USPC .......................................... 370/310

(58) Field of Classification Search
USPC .......................................... 370/310
See application file for complete search history.

(56) References Cited

U.S. PATENT DOCUMENTS

| 6,847,610 | B1* | 1/2005 | Suumaki et al. | 370/230.1 |
| 2006/0092924 | A1* | 5/2006 | Jeong et al. | 370/352 |
| 2006/0148483 | A1* | 7/2006 | Howard et al. | 455/450 |
| 2009/0016282 | A1* | 1/2009 | Gasparroni et al. | 370/329 |
| 2009/0017815 | A1* | 1/2009 | Takeda | 455/422.1 |
| 2009/0129342 | A1* | 5/2009 | Hwang et al. | 370/331 |
| 2012/0122464 | A1* | 5/2012 | Zhou et al. | 455/450 |

FOREIGN PATENT DOCUMENTS

WO 2006116190 A2 11/2006

OTHER PUBLICATIONS

3GPP: Technical Specification Group Services and System Aspects; GPRS enchancements for E-UTRAN access, Dec. 2007, Release 8.*
Ericsson, Link Layer Protocol evolution for LTE, Sep. 2, 2005.*

(Continued)

*Primary Examiner* — Hassan Kizou
*Assistant Examiner* — Tejis Daya
(74) *Attorney, Agent, or Firm* — Coats and Bennett, P.L.L.C.

(57) ABSTRACT

A node (120) for communication within a communication system (100), wherein the node (120) comprises a network signaling stack (122), the node (120) is adapted for serving as a first radio access platform which supports incoming packet switched connections, the node (120) is adapted for interconnecting to a second radio access platform which supports outgoing packet switched connections, and the node (120) is adapted for commissioning of an incoming packet switched connection.

20 Claims, 7 Drawing Sheets

(56) References Cited

OTHER PUBLICATIONS

3rd Generation Partnership Project. 3GPP TS 23.401, V2.0.0 (Dec. 2007), 3rd Generation Partnership Project; Technical Specification Group Services and System Aspects; GPRS enhancements for E-UTRAN access (Release 8), pp. 91-168, Dec. 2007.
3rd Generation Partnership Project. "P-CR on Abnormal Cases for Dedicated EPS Bearer Context Activation Procedure." 3GPP TSG CT WG1 Meeting #54, C1-082503, Zagreb, Croatia, Jun. 23-27, 2008.
3rd Generation Partnership Project. "Link Layer Protocol Evolution for LTE." 3GPP TSG-RAN-WG2 Meeting 48, R2-051947, London, US, Aug. 29-Sep. 2, 2005.
3rd Generation Partnership Project. "Separation of NAS Signaling an PCC Concepts." 3GPP TSG-SA WG@ Meeting #67, S2-086394, Sophia-Antipolis, France, Aug. 25-29, 2008.

* cited by examiner

COMMISSIONING INCOMING PACKET SWITCHED CONNECTIONS

This application claims the benefit of the filing date of U.S. Provisional Patent Application No. 61/101,209 filed Sep. 30, 2008, the disclosure of which is hereby incorporated herein by reference.

TECHNICAL FIELD

The invention relates to communication, especially to a node for communication within a communication system, a communication arrangement for communication within a communication system, a method executed by a node which supports incoming packet switched connections, a computer program adapted to perform such a method, and a computer-readable medium product comprising such a computer program.

BACKGROUND

Existing Universal Mobile Telecommunications System (UMTS) platforms already integrate several radio access technologies such as the so-called General Packet Radio Service (GPRS), Enhanced Data rates for GSM Evolution (EDGE), Wideband Code Division Multiple Access (WCDMA), and Evolved HSPA (eHSPA) in one platform. Concerning packet switched services, a UMTS mobile is independently of the current radio access technology (RAT) always connected to the same domain for packet services, the GPRS core network packet domain. Thus the User Equipment (UE) always uses the same principles for Internet Protocol (IP) bearer/connection management and allocation between the UE and the network.

The IP bearer/connection management and allocation in the GPRS packet domain is based on Primary Packet Data Protocol (PDP) contexts and Secondary PDP contexts and comprises functions for activation, deactivation and modification of them, as being described in the specification document issued by the Generation Partnership Project, named 3GPP TS 24.008 "Mobile Radio Interface Layer 3 specification; Core Network Protocols; Stage 3", which is herewith included by reference, thereby especially including the description of handling of Traffic Flow Templates (TFTs) and Quality of Service (QoS) profiles being specified per (Secondary) PDP contexts.

In existing mobile phone platforms, the IP bearer/connection management and allocation as specified by 3GPP for the GPRS packet domain is also the basis for the IP bearer/connection management and allocation functionality provided towards applications.

This functionality might be provided through any application programming interface (API). For internal applications, this functionality may be provided through the OPA (Open Platform API) interface, which is the name a mobile phone platform being developed by Telefonaktlebolaget L. M. Ericsson. Alternatively (e.g., for external applications) this functionality may be provided through the so-called AT command interface as described in the document: 3GPP TS 27.007 "AT command set for User Equipment (UE)", hereby incorporated by reference. To simplify the description in the following exemplarily only the AT command interface is considered, which in addition is an interface that is not only used by Ericsson mobile phone platforms, but probably by all wireless 3GPP based modems as it is part of the 3GPP standard.

Instead of using (Primary) PDP Contexts and Secondary PDP Contexts as in the GPRS packet domain, the Evolved Packet System (EPS), which is the packed-switched domain used for the so-called Long Term Evolution (LTE) radio technology being specified by the above-mentioned 3GPP, defining Default Bearers, Dedicated Bearers and Service Data Flows (SDFs) in the so-called Non-Access-Stratum (NAS) protocol, e.g. being specified in the documents 3GPP TS 23.401 "GPRS Enhancements for E-UTRAN access" and 3GPP TS 24.301 "Non-Access-Stratum (NAS) protocol for Evolved Packet System (EPS); Core Network Protocols; Stage 3". With regard to the SDFs, it should be mentioned that meanwhile the standard defined a further term, i.e. the Traffic Flow Aggregate, refer to TS 23.401, e.g. section 4.7.1 and the figure in section 4.7.2.2.

An SDF is always based on a Bearer. This also holds for a Traffic Flow Aggregate. Whenever statements regarding the term SDF are made in this document, such statements may also apply to the term Traffic Flow Aggregate. Several SDFs or Traffic Flow Aggregate with the same QoS may build an aggregated SDF or Traffic Flow Aggregate and may be mapped to the same Bearer. Contrary to the existing GPRS packet domain, where the decision of how to map SDFs (denoted as Traffic Flow Template in existing GPRS packet domains) and (secondary) PDP Contexts is done in the UE, in EPS the network decides how the mapping shall be done. This means an LTE Resource Allocation Request for an SDF or a Traffic Flow Aggregate issued by the application via NAS signaling can either return a new Dedicated Bearer with an SDF or a Traffic Flow Aggregate or return an already existing bearer with an additional SDF or Traffic Flow Aggregate. For the existing GPRS packet domain, the corresponding Secondary PDP Context Activate Request always returns a new (secondary) PDP Context. In both latter cases, a so-called outgoing packet switched (PS) connection is issued.

An incoming PS connection is characterized by the fact that from the UE perspective, no application has triggered the establishment of such a PS connection. The initiation is perceived as unsolicited. This type of PS connection is not supported by e.g. pre-release 7 3 GPP networks, or by other cellular network e.g. CDMA (Code Division Multiple Access).

In case of an outgoing PS connection, the application is the initiator, e.g. in LTE when the application issues a BEARER RESOURCE ALLOCATION REQUEST in network signaling (NS), the network responds with an activation (i.e. ACTIVATE DEDICATED EPS BEARER CONTEXT REQUEST) or modification (i.e. MODIFY EPS BEARER CONTEXT REQUEST) of an EPS bearer.

In case of an incoming PS connection the ACTIVATE DEDICATED EPS BEARER CONTEXT REQUEST or MODIFY EPS BEARER CONTEXT REQUEST would be received by the UE without an explicit trigger by the application. In the latter case, the modification of an existing EPS bearer may be sent to establish a new service flow.

There are may be several possibilities to implement the handling of incoming PS connections. One conventional concept is described in the following.

A conventional implementation of the handling of an incoming PS connection is shown in FIG. 7.

FIG. 7 shows a user equipment 30 having an LTS NS stack 36, a connection manager 34 and an application 32. User equipment 30 may be communicatively coupled to network 40 thereby constituting a communication system 50.

The incoming PS connection is commissioned by the connection manager 34 as soon as the application 32 initiates the connection setup.

An ACTIVATE DEDICATED EPS BEARER CONTEXT REQUEST 42 is received by the LTE NS stack 36 of the UE 30. LTE NS stack 36 forwards a connection setup request 44 to the connection manager 34 which, in turn, may send an accept reply 46 to the LTS NS stack 36. Next, an ACTIVATE DEDICATED EPS BEARER CONTEXT ACCEPT 48 is sent from the LTS NS stack 36 to the network 40.

Application 32 may send a connection setup request 50 to the connection manager 34 which, in turn, commissions the PS connection and may send back a response 52 to the application 32.

FIG. 8 illustrates as to how an outgoing PS connection is established.

Application 32 sends a connection setup request 60 to connection manager 34 which forwards the connection setup request 60 to LTE NS stack 36. LTE NS stack 36 then sends a BEARER RESOURCE ALLOCATION REQUEST 62 to the network 40 responding, in turn, to the LTE NS stack 36 with an ACTIVATE DEDICATED EPS BEARER CONTEXT REQUEST 64. Then, a connection setup response 66 is sent from the LTE NS stack 36 to the connection manager 34 which, in turn, sends a response 68 to the application 32 and an accept message 70 to the LTE NS stack 36. An ACTIVATE DEDICATED EPS BEARER CONTEXT ACCEPT 72 is then sent from the LTE NS stack 36 to the network 40.

Hence, the instance which manages the outgoing PS connections, i.e. the connection manager 34, has to handle also the incoming PS connection.

As shown in FIG. 9, a problem with the conventional implementation depicted in FIG. 7 and FIG. 8 arises when two radio-platforms, e.g. the LTE platform (which supports also the incoming PS connections) is acting as modem 70 and is connected to an existing/legacy radio access platform 74, e.g. WCDMA (which only supports outgoing PS connections).

FIG. 9, compare reference numeral 80, highlights (only exemplarily) the interface interactions which are not supported by the legacy platform 74 and which would have to be implemented in addition to interact with the LTE modem 70.

Hence, and referring to FIG. 10, in a conventional system application 32 uses connection manager 34 to trigger PS data connections into network. Triggered by application 32 with the connection setup request 60, the connection manager 34 configures the network signaling (NS) stack 36 with parameters for the Bearer like QoS, TFT and protocol type. The NS stack 36 uses the NAS protocol to signal this connection setup request towards the network 40. If a Resource Allocation was requested (see message 82), the network 40 provides either a Dedicated EPS Bearer or modifies an existing EPS Bearer. This mechanism shown in FIG. 10 is suitable for handling so-called outgoing connections. Further messages in this context (ACTIVATE DEDICATED EPS BEARER EVENT 84, ACTIVATE DEDICATED EPS BEARER CONTEXT ACCEPT 86, BEARER RESOURCE ALLOCATION RESPONSE 88, and CONNECTION STATUS INFORMATION message 90) are shown as well.

This concept works fine for e.g. existing/legacy WCDMA radio access platforms where only this type of connections had to be supported. However it is no longer sufficient for future systems as PS data connections can also be triggered by the network 40:

e.g. LTE requires setup of a Default EPS Bearer together with the attach procedure, but there might be no application which immediately requires this Default EPS Bearer.

e.g. as shown in FIG. 11, before handover (HO), the current network triggers the destination network to setup all bearers. After the bearers were established, the destination network signals these Bearers to the UE as incoming connections. Usually this procedure is completely handled within the NS stack 36 and upper layers in particular the connection manager 34 are not affected at all. But in systems where multiple RATs are handled within separate platforms (e.g. LTE data modem 70 attached to a WCDMA radio access platform hosting the application 74), the connection manager 34 responsible for the destination network's platform has not yet been configured for the connections which existed in the previous RAT. Thus the connection manager 34 receives incoming PS data connections but does not know to which application each Bearer has to be connected. The procedure is illustrated in FIG. 11 and is initiated by a handover command 94 received by the network 40.

A server application in the network might decide to setup a Bearer, e.g. signal an incoming VoIP call.

The messages used in FIG. 10 and FIG. 11 are based on NAS signaling between NS stack 36 and Network 40. All other communications are for illustration only but not based on any specific protocol.

SUMMARY

It is an object of the invention to enable a flexible interconnection between different radio access platforms.

In order to achieve the object defined above, a node for communication within a communication system, a communication arrangement for communication within a communication system, a method executed by a node which supports incoming packet switched connections, a computer program adapted to perform such a method, and a computer-readable medium product comprising such computer programs according to the independent claims are provided.

According to an exemplary embodiment of the invention, a node for communication within a communication system is provided. The node comprises a network signaling stack and is adapted for serving as a first radio access platform which supports incoming packet switched connections. The node is further adapted for interconnecting to a second radio access platform (which, in an embodiment, may host the application) which supports outgoing packet switched connections (particularly supports only outgoing packet switched connections, but in an embodiment does not support incoming packet switched connections), and for commissioning incoming packet switched connections. The second radio access platform may be located on a further node.

According to another exemplary embodiment of the invention, a communication arrangement for communication within a communication system is provided, the communication arrangement comprising a node having the above mentioned features. The communication arrangement further comprises a further node adapted for performing connection management, the further node being adapted for being interconnected to the first radio access platform which supports incoming packet switched connections and which commissions an incoming packet switched connection. The further node is also adapted for serving as the second radio access platform which supports (particularly only) outgoing packet switched connections.

According to yet another exemplary embodiment of the invention, a method executed by a node comprising a network signaling stack and serving as a first radio access platform which supports incoming packet switched connections is provided. The node is adapted for interconnecting to a second radio access platform which supports (particularly only) outgoing packet switched connections. The method comprises commissioning of an incoming packet switched connection by the node.

According to still another exemplary embodiment of the invention, a computer program is provided comprising code adapted to perform the step of the above method having the above mentioned features when loaded into a processing unit of a node.

According to yet another exemplary embodiment of the invention, a computer-readable medium product is provided which comprises at least one computer program having the above mentioned features.

Embodiments of the present invention also concern computer programs comprising portions of software codes in order to implement the method as described above when operated at a respective device. A computer program can be stored on a computer readable medium. A computer-readable medium can be a permanent or rewritable memory within a respective device or located externally. A computer program can be also transferred to a respective device for example via a cable or a wireless link as a sequence of signals.

Data processing which may be performed according to embodiments of the invention can be realized by a computer program, that is by software, or by using one or more special electronic optimization circuits, that is in hardware, or in hybrid form, that is by means of software components and hardware components.

The term "node" may particularly denote any communication device, for instance a transmitter/receiver device (transceiver), which allows for an exchange of communication messages with a communication partner over a communication system or network. Such a node may particularly be a wireless communication device, i.e. a communication device which communicates without the necessity of wires. However, wire-based communication may be also possible. A node may have processing resources, storage resources, and message transmitting/receiving resources.

The term "network signaling stack" may be denoted as a functional entity allowing the node to communicate with a communicatively connected network such as a telecommunications network. It may include a protocol stack such as a layered set of protocols which work together to provide a set of network functions.

The term "radio access platform" may particularly denote a platform, scheme or entity allowing for a communication in accordance with a dedicated radio access technology (for instance GPRS, EDGE, WCDMA, eHSPA, CDMA). Radio access technology may indicate a type of radio technology to access a core network. In the context of exemplary embodiments, the first radio access platform may be different from the second radio access platform, i.e. different radio access platforms may be combined in one communication arrangement.

The term "packet switching" may be denoted as a network communications method that groups all transmitted data, irrespective of content, type, or structure and to suitably sized blocks, called packets. A network over which packets are transmitted may be denoted as a shared network which routes each packet independently from all others and allocates transmission resources as needed. When traversing network adapters, switches and other network nodes, packets may be buffered and queued.

The term "incoming packet switched connection" may particularly denote that, from a perspective of a user equipment, no application has triggered the establishment of a packet switched connection. In other words, a corresponding request can be received by the user equipment without an explicit trigger by the application, i.e. from an external entity.

Accordingly, the term "outgoing packet switched connections" may particularly denote that, from a perspective of a user equipment, an application is the initiator of the establishment of a packet switched connection.

The term "commissioning" may particularly denote managing a packet switched (PS) connection, which may also include accomplishing and/or accepting the establishment of such a PS connection from a network. In other words, commissioning a PS connection may include handling the establishment of such a PS connection.

In order to overcome at least some of the above mentioned problems, an embodiment of the present invention interconnects a radio access platform acting as modem and supporting incoming PS connections (outgoing PS connections may or may not be supported by this radio access platform), with another radio access platform that supports only outgoing PS connections (but not incoming PS connections). In the context of this interconnection, the radio access platform acting as modem and supporting incoming PS connections may commission incoming PS connections. According to embodiments of the invention, a system is provided to perform a commission of the incoming PS connection not in the functional instance that performs the connection management, which typically resides on the platform that hosts an application, but to implement the commission of the incoming PS connections on the platform that supports the incoming PS connections, e.g. a LTE modem. Such an embodiment may have the advantage of providing a common interface towards applications for IP bearer and management independent of an active RAT (GPRS, EDGE, WCDMA, HSPA, LTE, or other RATs). Furthermore, it may enable the reuse, e.g. for LTE, of existing legacy applications that currently are working, e.g. for pre-release 7 WCDMA.

In the following, further exemplary embodiments of the node will be explained. However, these embodiments also apply to the communication arrangement, to the method, to the computer program and to the computer-readable medium product.

In an embodiment, the node serving as a first radio access platform which supports incoming packet switched connections may be free of hosting an application, i.e. does not host an application. In contrast to this, a further node serving as a second radio access platform which supports only outgoing packet switched connections may host such an application.

In an embodiment, the first radio access platform may be a Long Term Evolution (LTE) platform. LTE is standardized in 3GPP. By providing the node compatible with LTE, it is possible to operate this node in combination with another node lacking LTE capability but having, for instance, pre-release 7 WCDMA capability, so that such a WCDMA compatible node can be reused without changes.

According to an exemplary embodiment, the second radio access platform may be a legacy platform. The term "legacy platform" in particularly denotes any NS stack or radio access technology platform that deploys outgoing packet switched connections only. Thus, it can be considered as an already existing technology that continues to be used, for instance because it still functions for users needs, even though newer technology (particularly LTE technology) is available.

However, the further node using the second radio access technology may support General Packet Radio Service (GPRS), Enhanced Data rates for Global Evolution (EDGE), High Speed Packet Access (HSPA), evolved High Speed Packet Access (eHSPA), etc. Also platforms related to applications provided by a personal computer may be such legacy applications.

In an embodiment, the node may be adapted for completely commissioning of an incoming packet switched connection. In other words, the node alone may include the entire functionality required for providing the commissioning of the incoming package switched connection. The node may serve as the controlling entity which provides other entities with commands with regard to the commissioning. Therefore, in such an embodiment, no further entity is required to provide capability or resources for such commissioning tasks. Thus, all the commissioning services may be centered at the described node.

In an embodiment, the node may be adapted for commissioning of an incoming packet switched connection(s) without simultaneously performing an association towards an application hosted by the second radio access platform. "Performing an association towards an application" may particularly denote taking an action which is related to commissioning of packet switched connection(s) and which involves the application in this procedure. In other words, the application is not linked to any communication relating to the commissioning in an introductory phase. In a later phase, the application may be involved in the communication. In an embodiment, such an application may be located not at the node performing the commissioning, but at a further node which may also comprise a connection manager. It may be possible to preserve incoming connections in the node, particularly (but not necessarily) in a network signaling stack thereof, until a request from the connection manager for this specific connection is received.

The node may further be adapted for performing an association towards an application hosted by the second radio access platform in response to a receipt of a connection setup request from the application. In other words, although initiation of the commissioning does not require that the node involves a further node providing the application, receipt of a connection setup request from the application may be a trigger for the node to respond to such a received message. When the connection manager of the further node has received such a response from the node, it may confirm acceptance to the node and may send the response also to the application of the further node.

However, still referring to the previously described embodiment, the node may be adapted for performing the association in response to the receipt of the connection setup request only after a successful (previous) check of all known network connections. Such a check may determine whether requested connection parameters match to an existing network connection. Thus, when a connection request is received, the node may first check all known network connections (i.e. EPS bearers) whether the requested connection parameters (for instance IP address, port number, quality of service, etc.) match to an existing network connection. If so, it may link the application connection request to the corresponding modem network connection.

Still referring to the previously described embodiment, the node may further be adapted for—after a non-successful check of all known network connections with regard to the question whether requested connection parameters match to an existing network connection—requesting a new connection to a communicatively connected network and establishing an outgoing packet switched connection. Thus, if the analysis yields the result that the requested connection parameters do not match to an existing network connection, the modem may request a new connection (for instance EPS bearer) towards the network. An outgoing packet switching connection may be established in such a case.

The node may be adapted for acting as a modem. The term "modem" may be denoted as an entity used to modulate digital information so that it can be carried via an analog carrier. The signal may be then demodulated at a receiver end to extract the original digital data. The term modem originates from modulator and demodulator.

The node may be, or may be part of, a mobile communication device, a portable communication device, a mobile terminal, a mobile phone, a data card, a Personal Digital Assistant, a personal computer, a laptop, etc. The term "mobile communication terminal" may particularly denote any user equipment (UE). Hence, portable or stationary communication devices can be operated in accordance with the disclosed architecture of exemplary embodiments.

For instance, the node may be implemented for use in the context of telecommunications, particularly as a mobile phone or a part thereof.

Next, further exemplary embodiments of the communication arrangement will be explained. However, these embodiments also apply to the node, to the method, to the computer program and to the computer-readable medium product.

The further node may be adapted for hosting an application. An application may denote any instance which uses a service (e.g. connection setup, connection teardown, etc.) of a connection manager.

Moreover, the further node may comprise a connection manager. Such a connection management utility may be a piece of software or hardware that manages the activities and features of a network connection.

An application block and a connection manager block may form part of a user equipment, for instance a pre-release 7 WCDMA user equipment or any other legacy user equipment. Every platform that supports outgoing connections may be such a legacy user equipment.

In the following, further exemplary embodiments of the method will be explained. However, these embodiments also apply to the node, to the communication arrangement, to the computer program and to the computer-readable medium product.

The method may further comprise receiving a request from a communicatively coupled network to activate a dedicated packet switched domain. In an embodiment, such a request may be denoted as an ACTIVATE DEDICATED EPS BEARER CONTEXT REQUEST. Furthermore, in response to the received request, the method may comprise sending, by the node, a response to the communicatively coupled network to activate the dedicated packet switched domain. In an embodiment, such a response may also be denoted as an ACTIVATE DEDICATED EPS BEARER CONTEXT ACCEPT. Participation of an application in the communication process may be initiated later. The network may allow for a communicative connection to any communication party such as a base station, a further user equipment, a computer, etc.

Furthermore, in an embodiment, the method may comprise—particularly succeeding the previously mentioned method steps—receiving a request from the second radio access platform to setup a connection and, in response to the received request, sending a response to the second radio access platform to setup the connection. The received request may also be denoted as a connection setup request, whereas the sent response may also be denoted as a connection setup response.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

Figure 1:
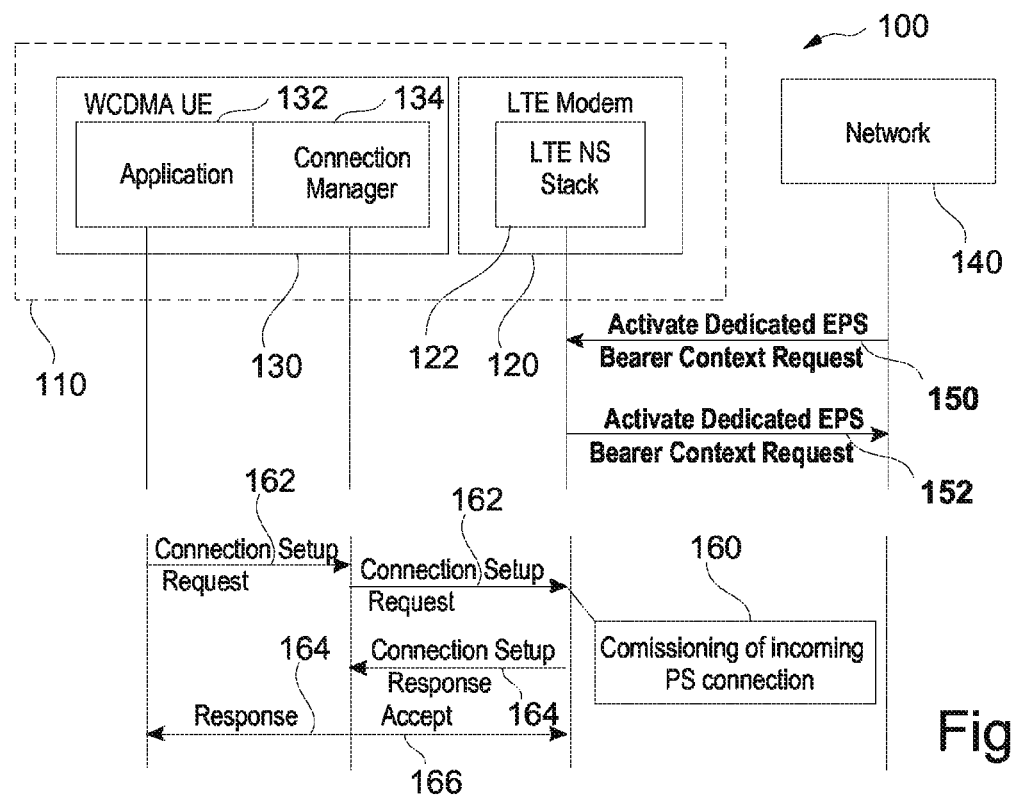
FIG. 1 illustrates a communication system according to an exemplary embodiment of the invention implementing incoming packet switched connection commissioning at the modem.

The illustration in the drawing is schematically. In different drawings, similar or identical elements may be provided with the same reference signs.

To simplify the description, exemplarily the LTE network signaling stack will be mentioned in the following as representative for a radio access technology that supports an incoming packet switched connection. The scope of exemplary embodiments of the invention applies for all radio access technologies which are supporting incoming packet switched connection. In the following, the handling of incoming LTE Network connections, i.e. incoming EPS Bearer, will be described exemplarily.

In the following, referring to FIG. 1, a communication system 100 according to an exemplary embodiment of the invention will be explained.

The communication system 100 comprises a network 140 such as a telecommunication network. This network 140 is communicatively coupled with a communication arrangement 110 for communicating within the communication system 100 and comprising a first node 120 and a second node 130. Nodes 120 and 130 may be physically separate nodes or may be combined to one common physical structure.

The first node 120 acts as a modem and serves as a Long Term Evolution platform (LTE) supporting incoming packet switched connections. An LTE NS stack 122 of the first node 120 serves as a control entity of the first node 120 within the communication system 100. The first node 120 may or may not support outgoing packet switched connections.

The first node 120 is communicatively interconnected to the second node 130 which includes an application block 132 and a connection manager block 134. The second node 130 supports only outgoing packet switched connections, not incoming packet switched connections. In the described embodiment, the second node 130 performs connection management and handles the application 132. The second node is a WCDMA UE (user equipment), but can also be any other legacy radio access node which only supports outgoing packet switched connections, not incoming packet switched connections.

In the embodiment of FIG. 1, the first node 120 performs alone commissioning of an incoming packet switched connection, whereas the second node 130 does not contribute anything to this commissioning task.

FIG. 1 includes also a sequence of method steps executed by the first node 120, the second node 130 and the network 140. As can be taken from FIG. 1, the first node 120 receives a request 150 from the communicatively coupled network 140 to activate a dedicated packet switched bearer or connection. This request 150 may be denoted as an ACTIVATE DEDICATED EPS BEARER CONTEXT REQUEST. In response to the received request 150, the first node 120 sends a response 152 to the communicatively coupled network 140 to activate the dedicated packet switched bearer or connection. This response 152 is denoted as an ACTIVATE DEDICATED EPS BEARER CONTEXT ACCEPT 152 in FIG. 1. The incoming packet connection 150,152 is high-lighted in FIG. 1. Application 132 is not involved in this stage of the method.

The first node 120 alone performs commissioning of an incoming packet switched connection (see reference numeral 160 in FIG. 1).

The application 132 hosted by the second node 130 may send a connection setup request 162 to the connection manager 134 which, in turn, may forward the connection setup request 162 to the first node 120. In response to the connection setup request 162, the first node 120 will communicate a connection setup response 164 to the connection manager 134. The connection manager 134, in turn, may forward the response 164 to the application 132, and may send an access communication message 166 to the first node 120.

Hence, FIG. 1 depicts an embodiment of the present invention in which the commissioning of an incoming PS connection is completely done at the radio access platform which acts as modem (e.g. a LTE modem), i.e. at the first node 120. The incoming PS connection is not exported to other platforms (e.g. the WCDMA platform of node 130 or a PC). The modem of the first node 120 accomplishes/accepts the establishment of the incoming PS connection from the network 140 without simultaneously performing an association towards the application 132. The association towards the application 132 is not done until a connection setup request 162 from the application 132 is received. When such a connection request 162 is received, the modem of the first node 120 first checks all known network connections (i.e. EPS bearers) to determine whether the requested connection parameters (e.g. IP Address, Port Number, QoS, etc.) match an existing network connection. If so, the modem of the first node 120 links the application connection request to the corresponding modem network connection. If not, the modem of the first node 120 requests a new connection (e.g. EPS bearer) towards the network 140 (not shown in FIG. 1). But, in the latter case a so-called outgoing PS connection is established.

Figure 2:
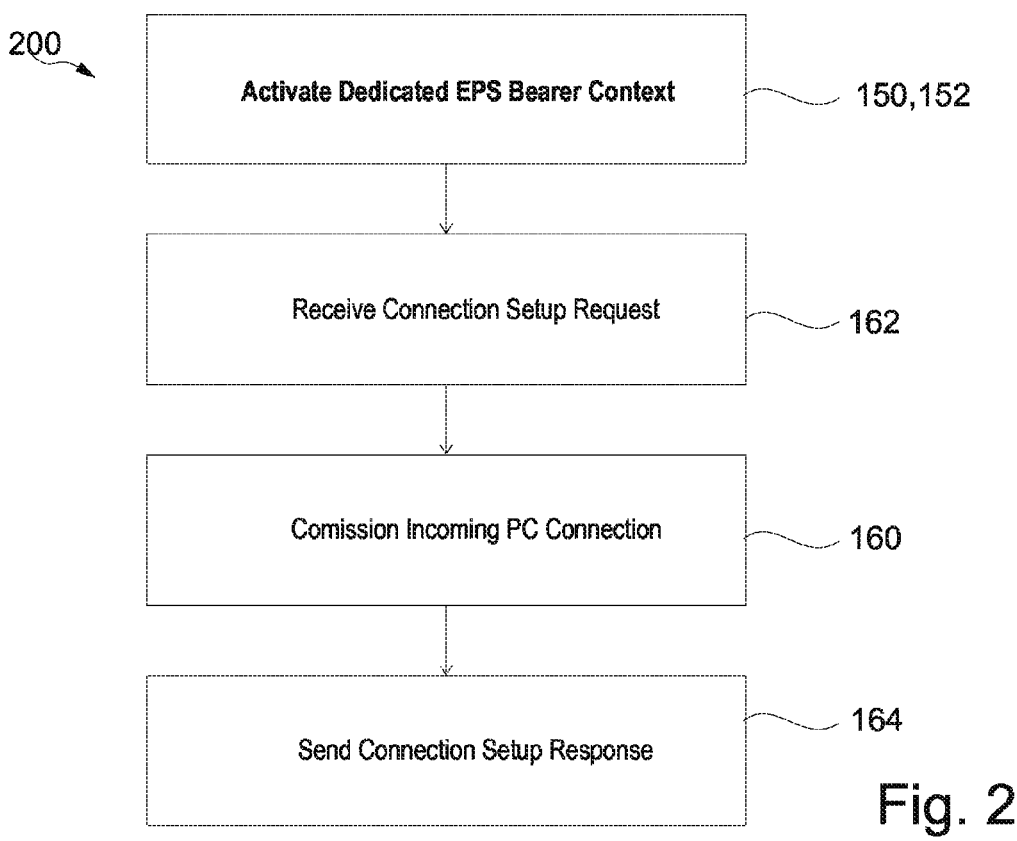
FIG. 2 illustrates a flow chart of a method according to an exemplary embodiment of the invention.

FIG. 2 shows a flow-chart 200 illustrating a method according to an exemplary embodiment.

In a block 150, 152, a dedicated EPS bearer is activated. In a subsequent block 162, a connection setup request 162 is received by the first node 120. Subsequently, an incoming PC connection is commissioned by the first node 120 alone, compare reference numeral 160. Then, a connection setup response message 164 is sent from the first node 120 to the second node 130. The incoming packet connection 150,152 is highlighted in FIG. 2.

Figure 3:
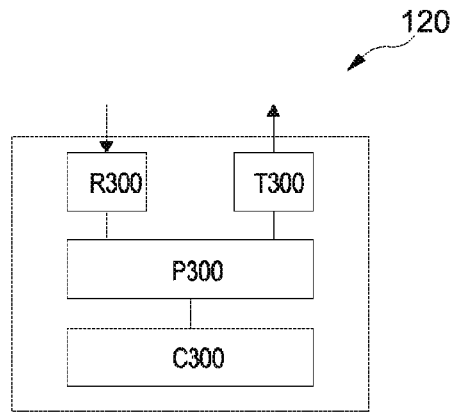
FIG. 3 illustrates constitution of a node according to an exemplary embodiment of the invention.

FIG. 3 schematically illustrates constitution of the node 120.

Node 120 may comprise a receiving unit R300 capable of receiving communication messages, a transmission unit T300 capable of transmitting communication messages, a processing unit P300 providing processing resources and a storage unit C300 providing storage resources. Although not shown explicitly, other nodes mentioned in this description or shown in the figures may have a similar constitution as the node 120, i.e. may also have corresponding blocks R300, T300, P300 and C300.

In the following, several use cases will be explained in which exemplary embodiments of the invention may be implemented. The following impacted use cases (UC) can be derived from the above explanations, particularly the explanations referring to FIG. 10 and FIG. 11:

Use Case UC [1]: Initial PDN connectivity request that is combined with the attach request to establish the initial Default EPS Bearer.

Use Case UC [2]: Inter Radio Access Technology (IRAT) Handover to a LTE cell (i.e. the LTE cell is the handover target). This addresses all cases comprising the IRAT cases.

Use Case UC [3]: Incoming PS connection by means of dedicated EPS bearers triggered by a Mobility Management Entity (MME).

The following concept description of the incoming PS data connection handling illustrates only principles of operation between NS and upper layers (connection manager and application). The description does not consider the different platform architectures, i.e. all combinations of the LTE Platform with other radio access technologies (ORATs). It describes only the pure concept that is independent from the architecture. The description does not elaborate, map the concept onto the impacted use cases UC [1] to UC [3] which are specified above. However, the skilled person will understand that the concept is of course applicable for all use cases.

A gist of the concept is to preserve incoming connections in the NS stack (or in another instance that is located in this node) until a request from the connection manager for this specific connection is requested, i.e. the NS stack comprises a dedicated module for this purpose.

For instance three different types of connections can be considered:

PDN (Public Data Network or Packet Data Network) connectivity (Default Bearer): An incoming Default Bearer will appear in UC [1] and UC [2]. The corresponding NAS message that has to be preserved by NS is ACTIVATE DEFAULT BEARER REQUEST.

Dedicated Bearer: This incoming connection is received in UC [2] or UC [3]. The corresponding NAS message is ACTIVATE DEDICATED BEARER REQUEST.

SDF or Traffic Flow Aggregate: This incoming connection is received in UC [2] or UC [3]. The corresponding NAS message is MODIFY EPS BEARER REQUEST with the IE "Operation Code" set to ADD TFT.

Each connection which is preserved by the NS Stack is preferably stored with the following settings, for instance:

PCO
BearerID
Linked Bearer ID
Packet Filter ID
IP Version
IP Address for IPv4 or Interface ID for IPv6

Bearer ID may be required to identify each connection and provide the correct connection to the connection manager when requested later on.

For the Use Cases UC [1] to UC [3], different procedures for connecting the incoming PS data connection to the right application have to be applied.

Figure 10:
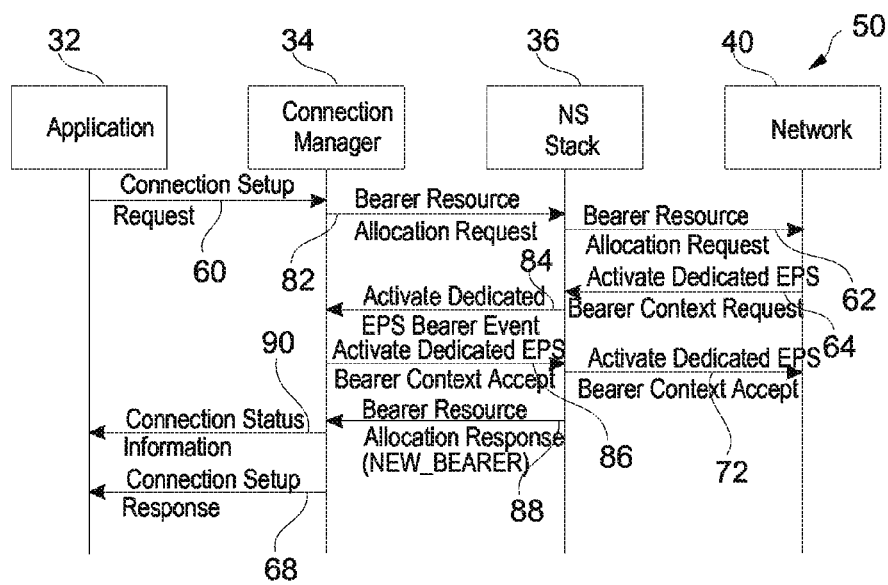
FIG. 10 illustrates an application which sets up an outgoing packet switched data connection.
Figure 11:
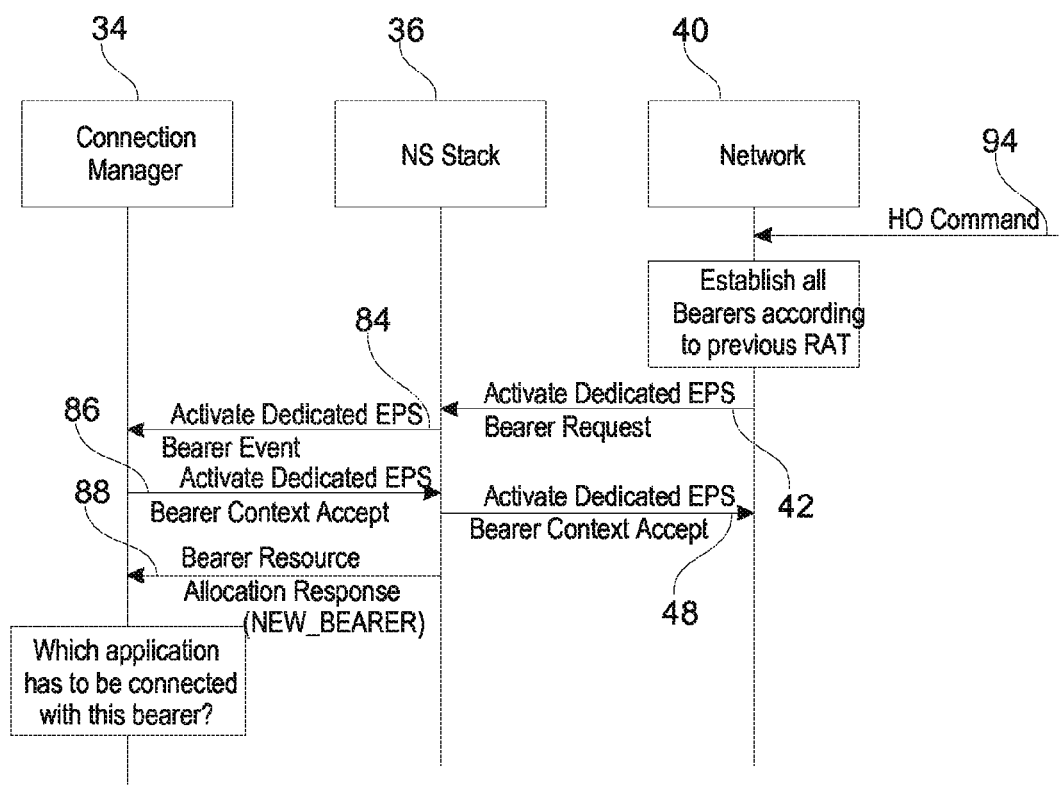
FIG. 11 illustrates an incoming packet switched data connection after handover.

In UC [1] the Default Bearer is not used by any application first. Some time later, a user may start an application which requires network connection. The application may trigger the connection manager with a setup connection request as shown in FIG. 10. The connection manager forwards this request to the NS stack with an unspecified Bearer ID, i.e. the Bearer ID is not chosen by the connection manager as it shall be assigned by network. The NS stack returns the Default Bearer received with the attach procedure.

Figure 4:
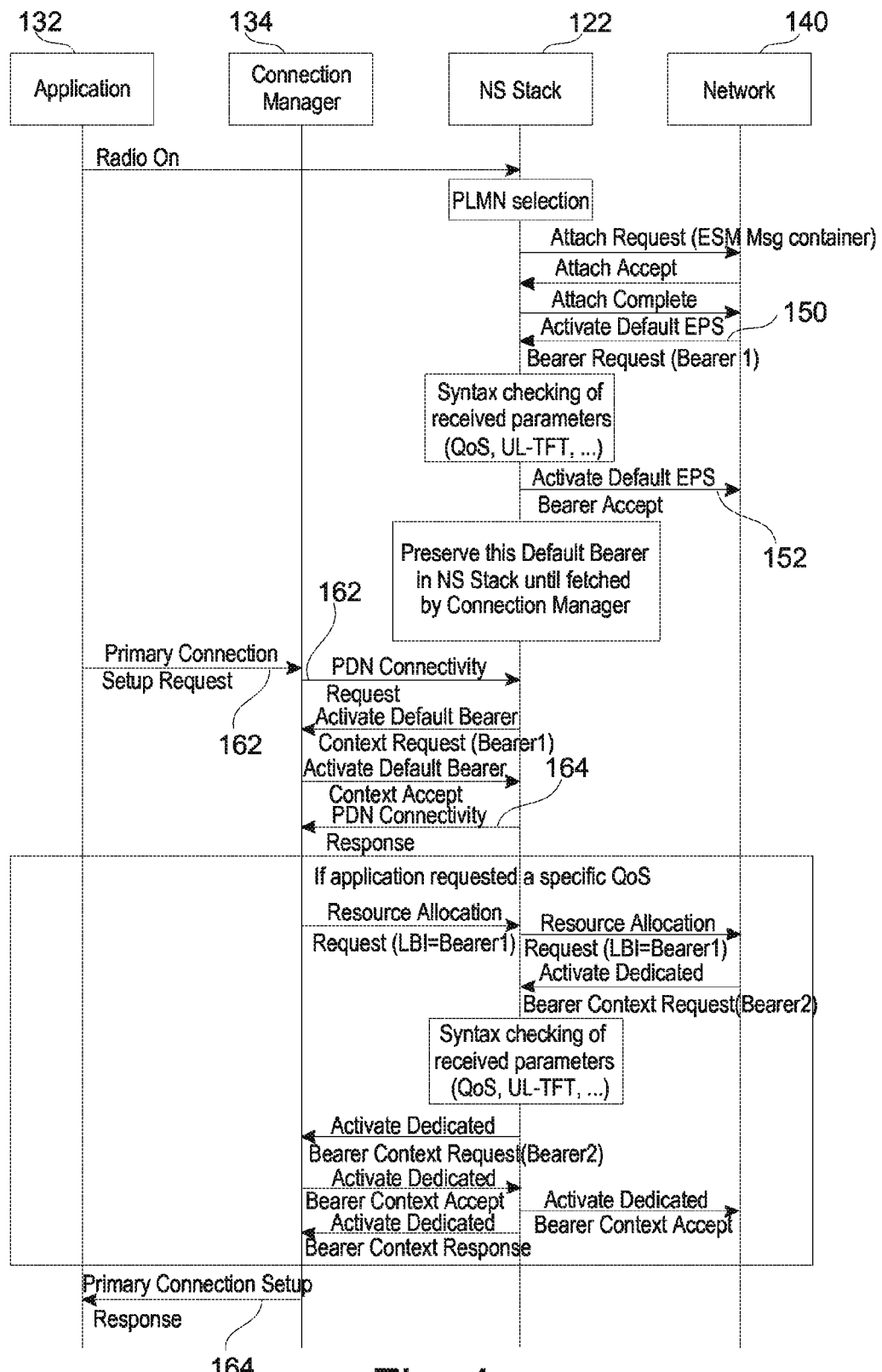
FIG. 4 illustrates a Message Sequence Chart for a first use case according to an exemplary embodiment of the invention.

FIG. 4 illustrates a Message Sequence Chart (MCS) for UC [1] (initial default bearer) according to an exemplary embodiment of the invention.

In UC [2] one or several Default Bearers or Dedicated Bearersare preserved by the NS stack until an application requests them with a PDN Connectivity Request/Resource Allocation using the right Bearer ID and the right Packet Filter ID. If the Bearer IDs will change during handover (HO), network has to provide a Bearer Mapping Table. This table is forwarded to a handover module (HOM) which translates this mapping table into separate setup connection requests towards the connection manager. Additionally the HOM informs the NS stack about all Bearer IDs which will be received from network during HO. In each setup connection request towards the connection manager a specific Bearer ID and—a specific Packet Filter ID—is passed by HOM. Also the information, if a Default Bearer, Dedicated Bearer or an SDF is requested should be contained in the request. The connection manager forwards this request to the NS stack. As the NS has been informed about the Bearer IDs that will arrive due to HO, it can match the Bearer ID provided with the connect request message of the connection manager. If the Bearer/SDF was already setup by network it can immediately passed to the connection manager. If not yet established, the connection manager has to wait until the connection was prepared from network.

To do the final connect of a Bearer to the right application, data received from a Bearer has to be put in a specific channel which terminates in the desired application. To associate the correct channel with a bearer, HOM has to receive a mapping table between Bearer IDs in the destination RAT and channel IDs.

Figure 5:
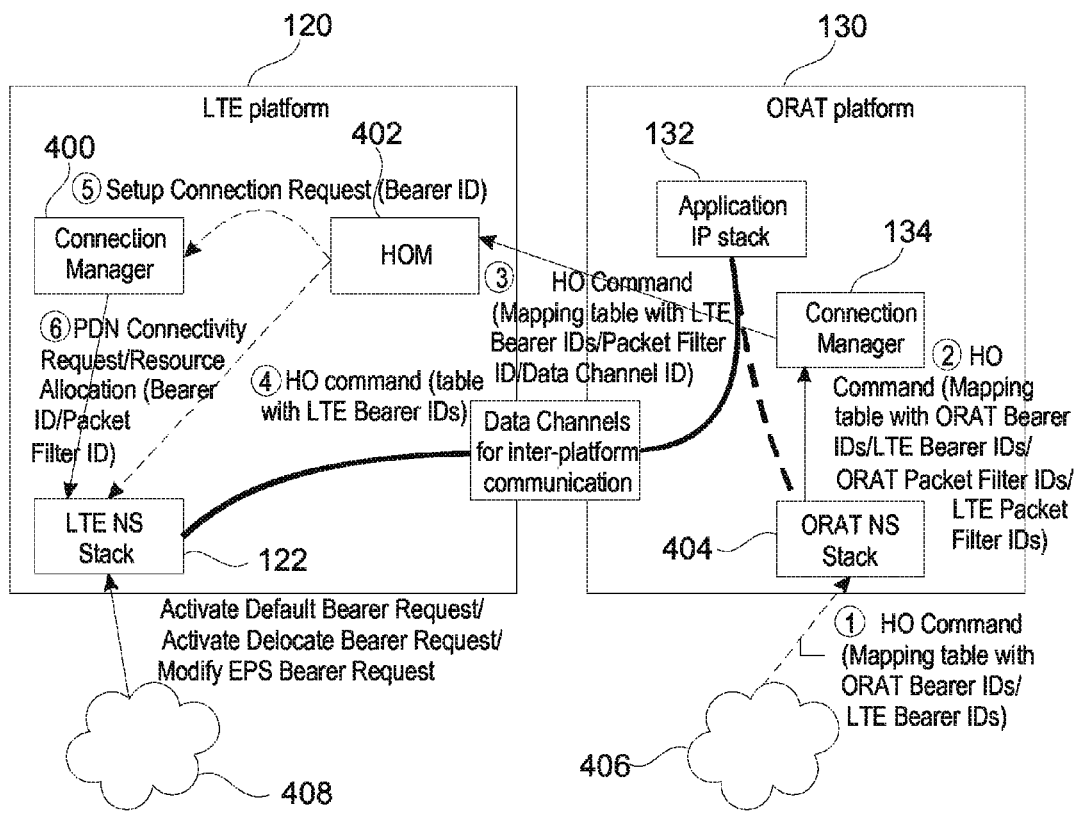
FIG. 5 illustrates a handover procedure from a radio access technology (RAT) platform to LTE as another radio access technology platform according to an exemplary embodiment of the invention.

The complete procedure is shown in FIG. 5.

LTE platform 120 comprises LTE NS stack 122 and additionally a connection manager 400 and handover module 402. ORAT platform 130 comprises application IP stack 132, connection manager 134 and additionally ORAT NS stack 404.

In a step 1, a handover command is received by ORAT NS stack 404 from an ORAT network 406.

In a step 2, the handover command is sent to the connection manager 134.

In a step 3, the handover command is sent to the handover module 402.

In a step 4, the handover command is sent to the LTE NS stack 122.

In a step 5, a setup connection request is transmitted from the handover module 402 to the connection manager 400.

In a step 6, the connection manager 400 sends a PDN connectivity request/resource allocation to the LTE NS stack 122.

FIG. 5 furthermore shows that the LTE NS stack 122 receives an ACTIVATE DEFAULT BEARER REQUEST/ ACTIVATE DEDICATE BEARER REQUEST/MODIFY EPS BEARER REQUEST from an LTE network 408.

The data path before handover is indicated by a broken bold line and after handover by a continuous bold line. Arrows indicate control signaling. It should be noted that the Figure shows merely one implementation example and selected items, e.g. a connection manager could be omitted depending on the embodiment.

Figure 6:
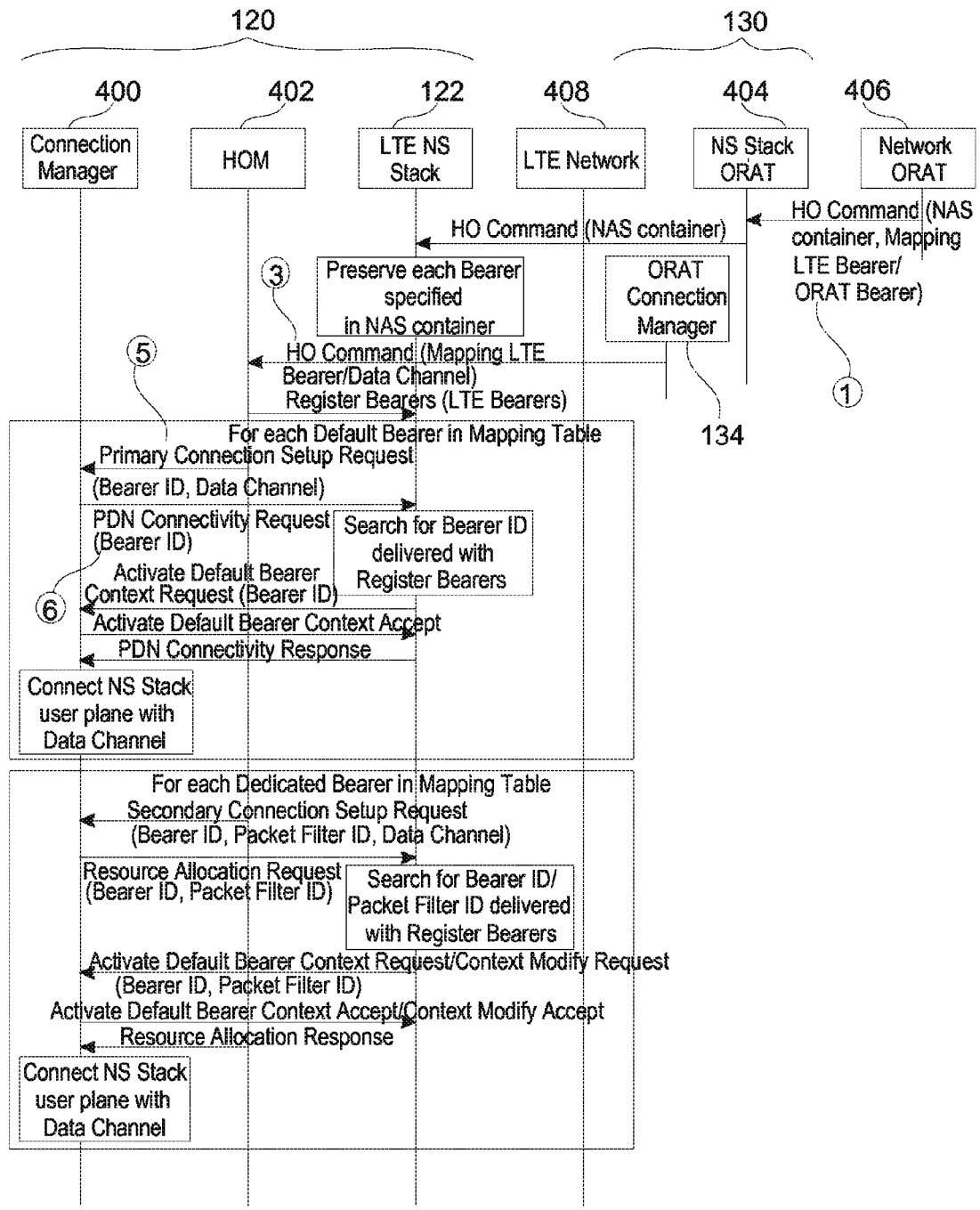
FIG. 6 illustrates a Message Sequence Chart for a second use case according to an exemplary embodiment of the invention.
Figure 7:
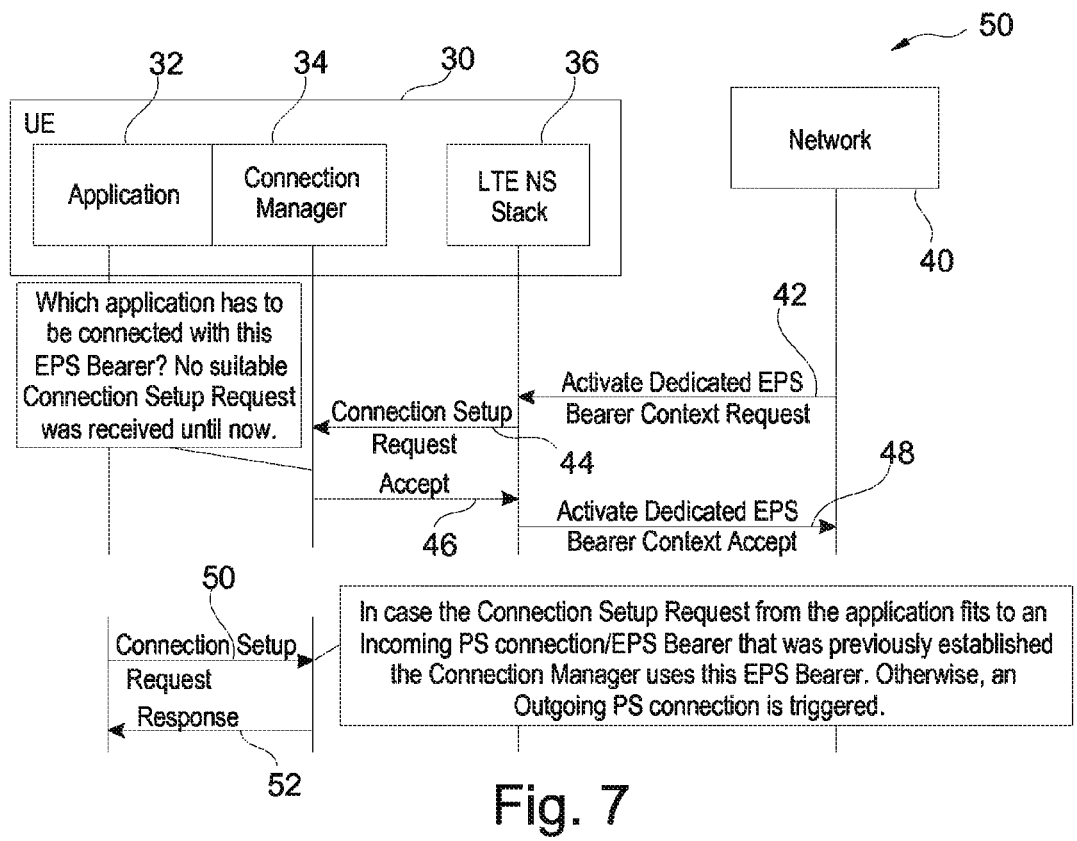
FIG. 7 illustrates a system with an incoming PS connection.
Figure 8:
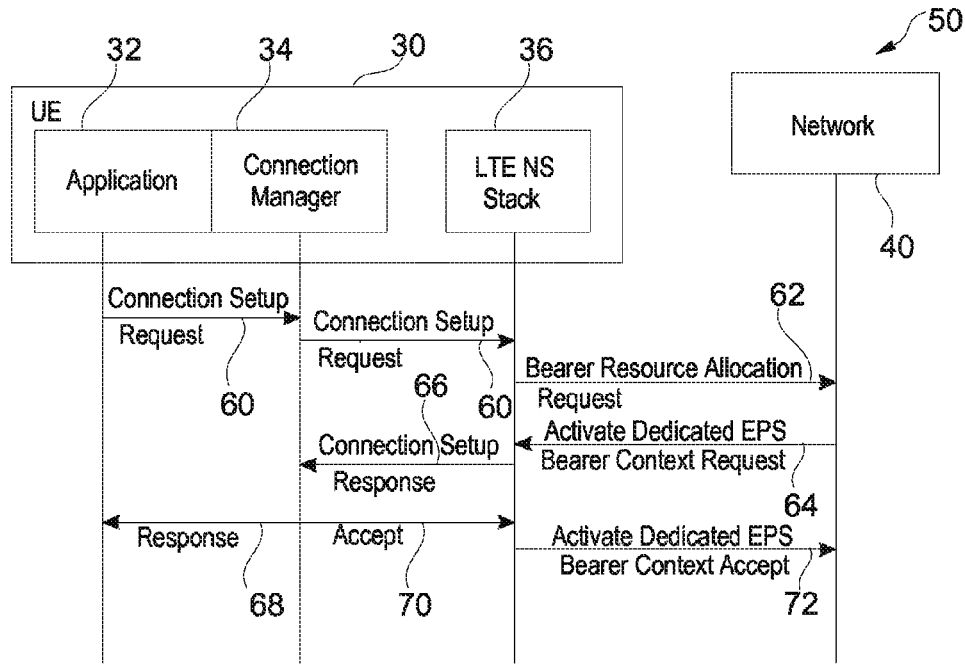
FIG. 8 illustrates a system with an outgoing PS connection.
Figure 9:
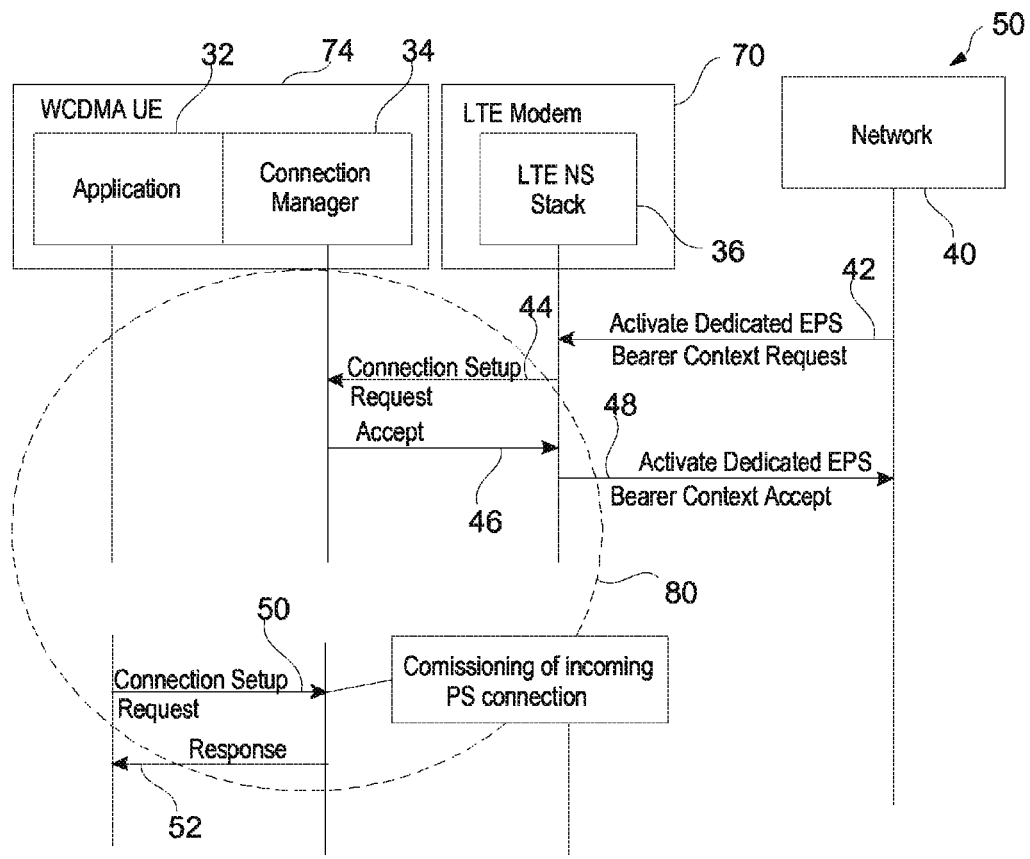
FIG. 9 illustrates a system with an incoming PS connection.

FIG. 6 illustrates a Message Sequence Chart (MCS) for UC [2] (handover) according to an exemplary embodiment of the invention.

In UC [3] a Default Bearer is received without being requested by an application. For example an IP Multimedia Subsystem (IMS) server in the network can decide to setup a VoIP connection. As the IMS server signals this also via Session Control to the UE (IMS terminal), it can trigger the connection manager to fetch the Dedicated Bearer which has been preserved by the NS Stack.

Next, some variants of the above embodiments will be mentioned.

The above-described concept for UC [2] (HO) assumes that when changing from ORAT into LTE RAT, the LTE Bearer establishment is e.g. triggered by the network. In this case the NS Stack has to process the NAS container instead of reacting on several Bearer Activation/Context Modify messages.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A node for communication within a communication system, wherein the node comprises a processing circuit configured to:
   provide a first radio access platform which supports incoming packet switched connections;
   interconnect to a second radio access platform which supports outgoing packet switched connections and which hosts an application; and
   implement a network signaling stack configured to communicate with a communicatively connected network and to handle establishment of incoming packet switched connections, by:
      receiving a connection request from the application;
      checking all existing network connections to determine whether connection parameters requested by the connection request match those of an existing network connection; and
      if the requested connection parameters match those of an existing network connection according to said checking, linking the connection request received from the application to that existing network connection.

2. The node according to claim 1, wherein the first radio access platform is a Long Term Evolution platform and the network connections are Evolved Packet System bearers.

3. The node according to claim 1, wherein the processing circuit is configured to perform the entire functionality for handling establishment of incoming packet switched connections, without any such functionality being provided by the second radio access platform.

4. The node according to claim 1, wherein the second radio access platform does not support incoming packet switched connections.

5. The node according to claim 1, wherein the requested connection parameters comprise at least one of an IP address, a port number, and a quality of service.

6. The node according to claim 1, wherein the network signaling stack is configured, if the requested connection parameters do not match those of an existing network connection according to said checking, to request a new connection to the communicatively connected network and to establish an outgoing packet switched connection.

7. The node according to claim 1, wherein the network signaling stack is further configured to:
   upon receiving an Activate Dedicated Evolved Packet System Bearer Context Request via the network, send a response to the network;
   after sending the response, receive a connection setup request from a connection manager communicatively coupled to the application hosted by the second radio access platform; and
   after receiving the connection setup request, perform said linking with regard to incoming packet switched connections towards the application by sending a connection setup response towards the connection manager.

8. The node according to claim 1, wherein the node is configured as a modem.

9. The node according to claim 1, wherein the node comprises, in whole or in part, a portable communication device, a mobile terminal, a mobile phone, a data card, a Personal Digital Assistant, a personal computer, or a laptop.

10. The node according to claim 1, wherein the second radio access platform only supports outgoing packet switched connections.

11. The node according to claim 1, wherein the network signaling stack is configured to preserve any given one of said incoming packet switched connections in the network signaling stack, without linking that connection with a particular application hosted by the second radio access platform, until a request for that connection is received from the second radio access platform.

12. A communication arrangement for communication within a communication system, the communication arrangement comprising:
   a first node comprising a processing circuit configured to:
      provide a first radio access platform which supports incoming packet switched connections;
      interconnect to a second radio access platform which supports outgoing packet switched connections and which hosts an application; and
      implement a network signaling stack configured to communicate with a communicatively connected network and to handle establishment of incoming packet switched connections, by:
         receiving a connection request from the application;
         checking all existing network connections to determine whether connection parameters requested by the connection request match those of an existing network connection; and if the requested connection parameters match those of an existing network connection according to said checking, linking the connection request received from the application to that existing network connection; and a second node configured to serve as the second radio access platform, to perform connection management, and to interconnect to the first radio access platform.

13. The communication arrangement according to claim 12, wherein the first node is configured to perform the entire functionality for handling establishment of incoming packet switched connections, without any such functionality being provided by the second node.

14. The communication arrangement according to claim 12, wherein the second radio access platform only supports outgoing packet switched connections.

15. A method executed by a node that comprises a processing circuit, the processing circuit configured to provide a first radio access platform which supports incoming packet switched connections, to interconnect to a second radio access platform which supports outgoing packet switched connections and which hosts an application, and to implement a network signaling stack for communicating with a communicatively connected network, wherein the method is implemented by the network signaling stack implemented by the node's processing circuit and comprises handling establishment of incoming packet switched connections by:

receiving a connection request from the application;

checking all existing network connections to determine whether connection parameters requested by the connection request match those of an existing network connection; and if the requested connection parameters match those of an existing network connection according to said checking, linking the connection request received from the application to that existing network connection.

16. The method according to claim 15, further comprising:
receiving a request from the communicatively coupled network to activate a dedicated packet switched domain; and in response to the received request, sending a response to the communicatively coupled network to activate the dedicated packet switched domain.

17. The method according to claim 15, further comprising:
receiving a request from the second radio access platform to setup a connection;

in response to the received request, sending a response to the second radio access platform to setup the connection.

18. The method according to claim 15, further comprising:
receiving a request from the communicatively coupled network to activate a dedicated packet switched domain;

in response to the request received from the communicatively coupled network, sending a response to the communicatively coupled network to activate the dedicated packet switched domain;

after sending that response, receiving a request from the second radio access platform to setup a connection; and in response to the request received from the second radio access platform, sending a response to the second radio access platform to setup the connection.

19. The method according to claim 15, wherein the second radio access platform only supports outgoing packet switched connections.

20. A computer program product stored on a non-transitory computer-readable medium and comprising code that, when executed by a processing unit of a node, causes the node to:
provide a first radio access platform which supports incoming packet switched connections;

interconnect to a second radio access platform which supports outgoing packet switched connections and which hosts an application; and implement a network signaling stack configured to communicate with a communicatively connected network and to handle establishment of incoming packet switched connections, by:

receiving a connection request from the application;

checking all existing network connections to determine whether connection parameters requested by the connection request match those of an existing network connection; and if the requested connection parameters match those of an existing network connection according to said checking, linking the connection request received from the application to that existing network connection.

* * * * *